(12) United States Patent
Munje

(10) Patent No.: US 7,974,636 B2
(45) Date of Patent: *Jul. 5, 2011

(54) INTELLIGENT PAGING IN MULTIPLE NETWORKS

(75) Inventor: Arun Munje, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 23 days.

This patent is subject to a terminal disclaimer.

(21) Appl. No.: 12/246,760

(22) Filed: Oct. 7, 2008

(65) Prior Publication Data

US 2009/0029719 A1 Jan. 29, 2009

Related U.S. Application Data

(63) Continuation of application No. 10/787,296, filed on Feb. 27, 2004, now Pat. No. 7,450,953.

(51) Int. Cl.
*H04Q 7/20* (2006.01)
(52) U.S. Cl. ..................... 455/456.1; 455/458
(58) Field of Classification Search .................. 455/458, 455/432.1, 433, 456.1, 456.5, 552.1, 553.1
See application file for complete search history.

(56) References Cited

U.S. PATENT DOCUMENTS

| | | | |
|---|---|---|---|
| 5,369,681 | A | 11/1994 | Boudreau et al. |
| 5,548,631 | A | 8/1996 | Krebs et al. |
| 6,151,501 | A | 11/2000 | Belkin et al. |
| 6,560,457 | B1 | 5/2003 | Silver et al. |
| 2003/0153317 | A1 | 8/2003 | Friman et al. |
| 2004/0102199 | A1 | 5/2004 | Haumont |

FOREIGN PATENT DOCUMENTS

| | | |
|---|---|---|
| EP | 0 851 703 | 7/1998 |
| EP | 1 071 304 A1 | 1/2001 |
| WO | WO 2004/101725 | 1/2004 |

OTHER PUBLICATIONS

OMA Input Contribution document, (referring to PoC documents) Doc. #OMA-POC-2003-0007Ri-Contributed Specification Suite. Oct. 6, 2003.
iDEN™ Technical Overview document, 68P81095E55-E (Software Release 9.1).
Push-to-Talk over Cellular (PoC) User Plane; Transport Protocols; PoC Release 1.0, Transport Protocols V1.1.1 (Oct. 2003).
Push to Talk over Cellular (PoC); List Management and Do-no-Disturb; PoC Release 1.0; List Management and Do-not-Disturb V1.1.4 (Oct. 2003).
Push-to-Talk over Cellular (PoC) User Plane; (E)GPRS/UMTS Specification; PoC Release 1.0; (E)GPRS/UMTS Specification V.1.1. (Oct. 2003).
Push-to-Talk over Cellular (PoC); Signalling Flows; PoC Release 1.0; Signalling Flows V1.1.4 (Oct. 2003).

(Continued)

*Primary Examiner* — Temica M Beamer

(57) ABSTRACT

A method and system are provided for paging a mobile device in the intersection of logical areas of two or more different subsystems using information indicative of the logical areas of each subsystem in which the mobile device is likely located. In some embodiments, only those cells which belong to at least two of the different logical areas in which the mobile device is likely located are used to page the mobile device. In some embodiments, the intersection area is used to provide paging access to a first network on which a mobile is not active, by sending a first network page or a request to listen for the page over the second network.

22 Claims, 6 Drawing Sheets

OTHER PUBLICATIONS

Push-to-talk over Cellular (PoC); Architecture; PoC Release 1.0, Architecture V1.1.1 (Oct. 2003).

Push-to-Talk over Cellular (PoC); User Requirements; PoC Release 1.0; User Requirements V1.1.1 (Oct. 2003).

I.F. Akyildiz et al., "A Dynamic Location Management Scheme for Next-Generation Multitier PCS Systems", IEEE Transactions on Wireless Communications, vol. 1, No. 1, Jan. 2002, IEEE, Piscataway, USA, pp. 178-189.

E. Ekici, "On signaling performance bounds of location management in Next Generation Wireless Networks", in Computer Networks: Elsevier B.V., vol. 46, pp. 797-816, Jul. 31, 2004.

I.F. Akyildiz et al., "Mobility Management in Next Generation Wireless Systems", Proceedings of IEEE, Vo. 87, No. 8, pp. 1347-1384, Aug. 1999.

INTELLIGENT PAGING IN MULTIPLE NETWORKS

RELATED APPLICATION

This application is a continuation of application Ser. No. 10/787,296, which was filed on Feb. 27, 2004.

FIELD OF THE DISCLOSURE

This disclosure relates to wireless communication systems, and more particularly to paging in wireless communication systems having multiple networks.

BACKGROUND

In wireless communication systems which provide two or more different services, if the services are sufficiently dissimilar, a substantially independent network is provided for each service, resulting in a system with multiple networks. An example of a system providing multiple services is the iDEN™ system of Motorola™ which provides dispatch services including Push-To-Talk™ (PTT™), and interconnect services for regular phone call services. Although independent in the sense that they provide different services, the networks of a multiple network system may share various hardware and software resources as required. For example, in the iDEN™ system, the dispatch network providing the dispatch services and the interconnect network providing GSM-like telephone services share EBTSs (Enhanced Base Transceiver Stations), cells, and various other resources.

Paging mobile devices registered on a network but idle when paged uses network resources. If the location of a mobile device were completely unknown, in order to ensure that the mobile device is paged, all of the cells of the entire network (from which the page originated) would be used to page the mobile device. This uses valuable network resources.

To increase mobile device paging efficiency, typically for each network in a wireless communication system, cells are grouped into logical areas. The mobile device and the network tracks the particular area(s) in which the mobile device is or most recently was located by having the mobile device update, in the network, a log of the mobile's location whenever it crosses into a new logical area. When a page over a service associated with a particular network is to be transmitted, only those cells in the area in which the mobile device is most likely located are paged, efficiently ensuring a level of certainty that the mobile device is paged. The cost of paging a mobile device which is registered on a network but is idle when paged, is reduced because not all of the cells of the network are used to page the mobile device. Moreover, since the mobile device updates the network of the logical area into which it crosses every time it crosses a logical area boundary, having a logical area made up of one cell is wasteful of both network resources and the mobile device's battery. Accordingly, a logical area of a size less than the entire network but larger than a single cell is typical.

BRIEF DESCRIPTION OF THE DRAWINGS

Preferred embodiments of the disclosure will now be described with reference to the accompanying diagrams, in which.

DETAILED DESCRIPTION OF EMBODIMENTS

Figure 1A:
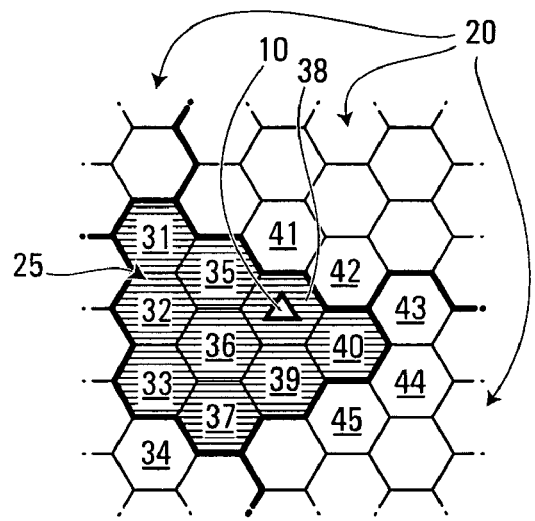
FIGS. 1A and 1B are diagrams of logical groupings of cells into areas according to two different networks indicating the respective logical areas in which an example mobile device is located.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides a method and system for paging a mobile device in the intersection of areas of two or more different networks in which the mobile device is likely located. In some embodiments, the areas are logical areas of each network in which the mobile device most recently reported its location. Advantageously, only paging locations which overlap at least two of the different logical areas in which the mobile device is likely located are used to page the mobile device. In some embodiments, the intersection area is used to provide paging access to a first network on which a mobile device is currently not active, by forwarding the most recently known logical area identifier of the mobile device to a second network, and requesting that the second network page the mobile device with the first network page embedded therein, or to page the mobile device relaying a request for the mobile device to listen for a page on the first network.

According to a first broad aspect, the disclosure provides a method of paging a mobile station in a communications system comprising at least two networks, the method comprising: tracking a first location area of the mobile device in a first network; separately tracking a second location area of the mobile device in a second network; determining a paging area based on both the first location area and the second location area; and transmitting a page in the paging area for the mobile device.

According to a second broad aspect the disclosure provides a communications system configured for paging a mobile station, the communications system comprising: a first network configured for tracking a first location area of the mobile device; a second network configured for separately tracking a second location area of the mobile device; an area overlap determiner configured for determining a paging area based on both the first location area and the second location area; and a service controller configured to send a page to the paging area for the mobile device.

Other aspects and features of the present disclosure will become apparent to those of ordinary skill in the art upon review of the following description of specific embodiments of the disclosure in conjunction with the accompanying figures.

Due to the differences between the nature and manner of provision of services in a multiple network communication system, it is often the case that the logical areas of one network are not made of the same group of cells which make up any particular logical area of a different network. For example, in the iDEN™ system, two of the different services provided to a mobile device, dispatch services and interconnect GSM-like services, occur through the same EBTS's and hence using the same cells in the wireless system. In the iDEN™ system, for the dispatch services the cells are grouped into logical areas known as dispatch location areas (DLAs), and for telephone services the cells are grouped into logical areas known as location areas (LAs).

Although the respective logical areas in which the mobile device is located for each network are tracked by the network and the mobile device, the interrelationship between the cells making up the logical areas of different networks previously has not been used to further isolate the location of the mobile device. Previously, cells situated inside the logical area of one network but lying outside the differently shaped logical area of another network were nonetheless paged. According to embodiments of the present disclosure paging is directed to cells of the intersection between the logical areas, which is more efficient than previous methods and systems since each logical area (which the mobile device most recently reported being located in) defines in addition to an area in which the mobile device is likely located (inside the logical area) an area in which the mobile device is less likely located (outside the logical area). Previous systems simply do not identify or use the intersection of the respective logical areas, namely those cells which belong to both logical areas in which the mobile device is most likely located.

In known systems, if paging is performed for either service (in either network), all of the cells of the respective logical area in which the mobile device is likely located are paged. Embodiments of the present disclosure take advantage of the efficiency gained by paging a number of cells (which make up the intersection of logical areas) which is less than the number of cells of either logical area since the cells of the intersection are only a subset of either logical group of cells.

Figure 1B:
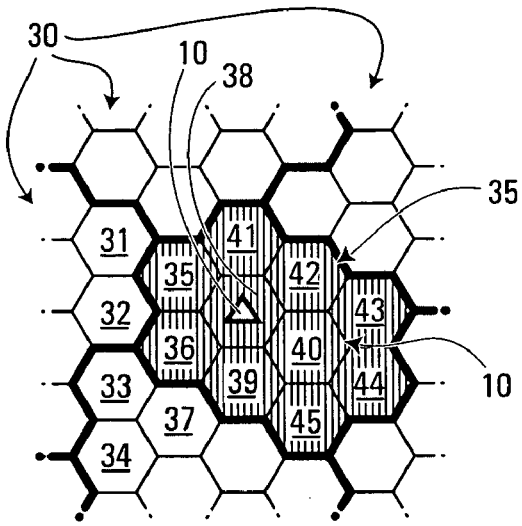

Referring to FIGS. 1A and 1B, two networks of a wireless communication system and the respective cells comprising logical areas will now be described. It should be noted that although the embodiments discussed hereinbelow are implemented in networks sharing transceiver stations, as described below, other embodiments can be implemented without sharing transceiver stations.

FIG. 1A depicts a grouping of cells of a first network by network logical areas 20, the first network providing a first service within the system. Paging locations in the system in FIG. 1A are cells, and these also represent the smallest paging areas of the system meaning that a cell is the smallest area that can be paged. In another embodiment, the smallest paging location that can be paged may be made of multiple smaller paging areas that are always paged as a group. The logical grouping by logical areas 20 is indicated by emphasized borders. A mobile device 10 is shown located within one of the logical areas 20 of the first network, specifically, in logical area 25, indicated by the shaded area. The particular logical area of the first network in which the mobile device is located is tracked by the first network. In some embodiments the mobile device 10 also tracks the particular logical area of the first network in which the mobile device is located. In some embodiments, due to the dynamic nature of the system and the mobility of the mobile device, the logical area is the logical area in which the mobile device was most recently known to be located in. Logical area 25 of the first network contains cells 31, 32, 33, 35, 36, 37, 38, 39, and 40. FIG. 1A could for example represent in the iDEN™ system, location areas 20 for the GSM-like telephone services of an interconnect network. The specific location area 25 in which the mobile device 10 was most recently known to be located is tracked with a location area identifier (LAI) which is updated whenever the mobile device travels from one location area 20 into another.

FIG. 1B depicts a grouping of cells of a second network by logical areas 30, the second network providing a second service within the system. The cells depicted in FIG. 1B are the same as those in FIG. 1A, however the logical grouping of logical areas 30 indicated by emphasized borders, is according to the second network. The mobile device 10 is located within one of the logical areas 30 of the second network, specifically in logical area 35, indicated by shading. As with the first network, the particular logical area in which the mobile device is located (or most recently known to be located), is tracked by the second network. In some embodiments the mobile device 10 also tracks the particular logical area of the second network in which the mobile device is located. Logical area 35 of the second network contains cells 35, 36, 38, 39, 40, 41, 42, 43, 44, and 45. FIG. 1B could for example represent in the iDEN™ system, dispatch location areas 30 for the Push-To-Talk™ services of a dispatch network. The specific dispatch location area (DLA) 35 in which the mobile device 10 has been recently located is tracked with a dispatch area identifier (DAI) which is updated whenever the mobile device travels from one dispatch location area 30 into another.

It should be understood that the specific cell and logical area arrangements that are shown in FIGS. 1A and 1B, are only illustrative of a possible arrangement of cells and logical areas and should not be taken as limiting the embodiments described which may be implemented in any of a number of different cell and logical area arrangements in accordance with the disclosure.

Figure 2:
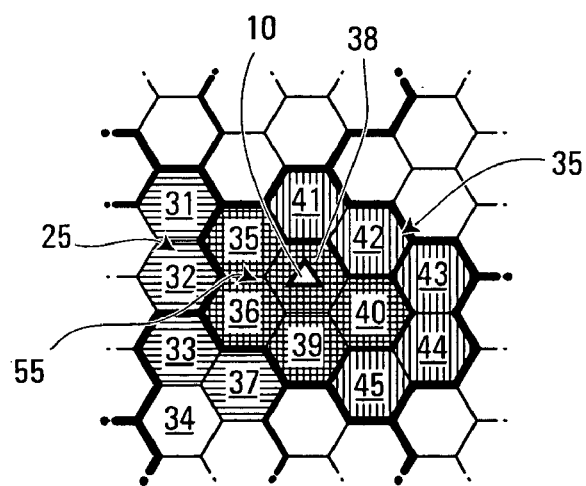
FIG. 2 is a diagram depicting the subset of cells making up the intersection of logical areas of FIG. 1 in which the mobile device is located, according to one embodiment of the disclosure.

Referring now to FIG. 2, the subset of cells making up the intersection of logical areas of FIGS. 1A and 1B in which the mobile device is being tracked, according to one embodiment of the disclosure will be described. In FIG. 2, the logical areas of both the first network and the second network are shown. The logical area 25 of the first network and the logical area 35 of the second network in which the mobile device 10 is located are shaded. The intersection area 55 which consists of a subset of cells which belong to both logical areas 25 and 35 of the first and second networks respectively, is indicated with double shading. This intersection area contains cells 35, 36, 38, 39, and 40.

In a typical scheme for paging the mobile device 10 through the first network, all of the cells of the logical area 25 of the first network would be used to page the mobile device 10 until it is found. In a typical scheme for paging the mobile device 10 through the second network, all of the cells of the logical area 35 of the second network would be used to page the mobile device 10 until it is found. Advantageously, according to the embodiment of the disclosure depicted in FIG. 2, if the mobile device 10 is paged through the first network, only the cells belonging to the intersection of the logical areas (of the first and second network) in which the mobile device 10 was last known to be located, are used to page the mobile device 10.

In some embodiments, the mobile device may be paged through either the first network or the second network. In both cases, only the cells belonging to the intersection of the logical areas (of the first and second networks) in which the mobile device was last known to be located are used to page the mobile device.

It should be noted that although both the first and second networks of the embodiment illustrated in FIGS. 1A, 1B, and 2 share the same cells (and hence the same EBTSs), the disclosure contemplates network overlap in the general sense of two or more networks which may or may not share resources or cell boundaries. In a case where the networks do not share resources or cell boundaries, information regarding which cells of one network geographically overlap which cells of the other network may be predetermined and available to each network, or may otherwise be calculated. Each cell of the logical area of one network in which the mobile device 10 was most recently reported being located which overlaps a cell of a logical area of a second network in which the mobile device 10 was most recently reported being located forms part of the intersection area.

In some embodiments with different networks, instead of a strict geographical area overlap, a larger extended overlap may be utilized. Since various factors may effect how and from where certain pages to a particular location must be performed, in a system involving EBTSs of different networks at different geographical locations, a geographical overlap may not provide enough certainty or efficiency. The extended overlap of some embodiments include both the geographical overlap as described above and an extension region. The extension region in a straightforward embodiment comprises all neighbor cells of the cells of the intersection area which are not cells of the intersection area. This may be extended to neighbor cells of the neighbor cells and so on. As a result, in the straightforward embodiment, the extension region forms a region around the periphery of the intersection area.

The extension region can help to ensure, by virtue of the extended region of paging, that the mobile is paged.

Individual networks of a multiple network system which are particularly suited for incorporation of the system and method according to the disclosure have separate paging systems and different logical area mappings, in which the different individual networks are adapted to communicate with each other.

Although the logical areas of each network have been described as being either the logical area in which the mobile device is located or the logical area in which the mobile device was last known to be located, a logical area may be defined by other criteria which imply a likely location of the mobile device when the page is delivered. Generally, the logical area of one network may be defined as the area which would be subject to a page over that first network if there were no other networks. In these embodiments, the intersection of logical areas is the area in which both networks would page the mobile device.

Figure 3:
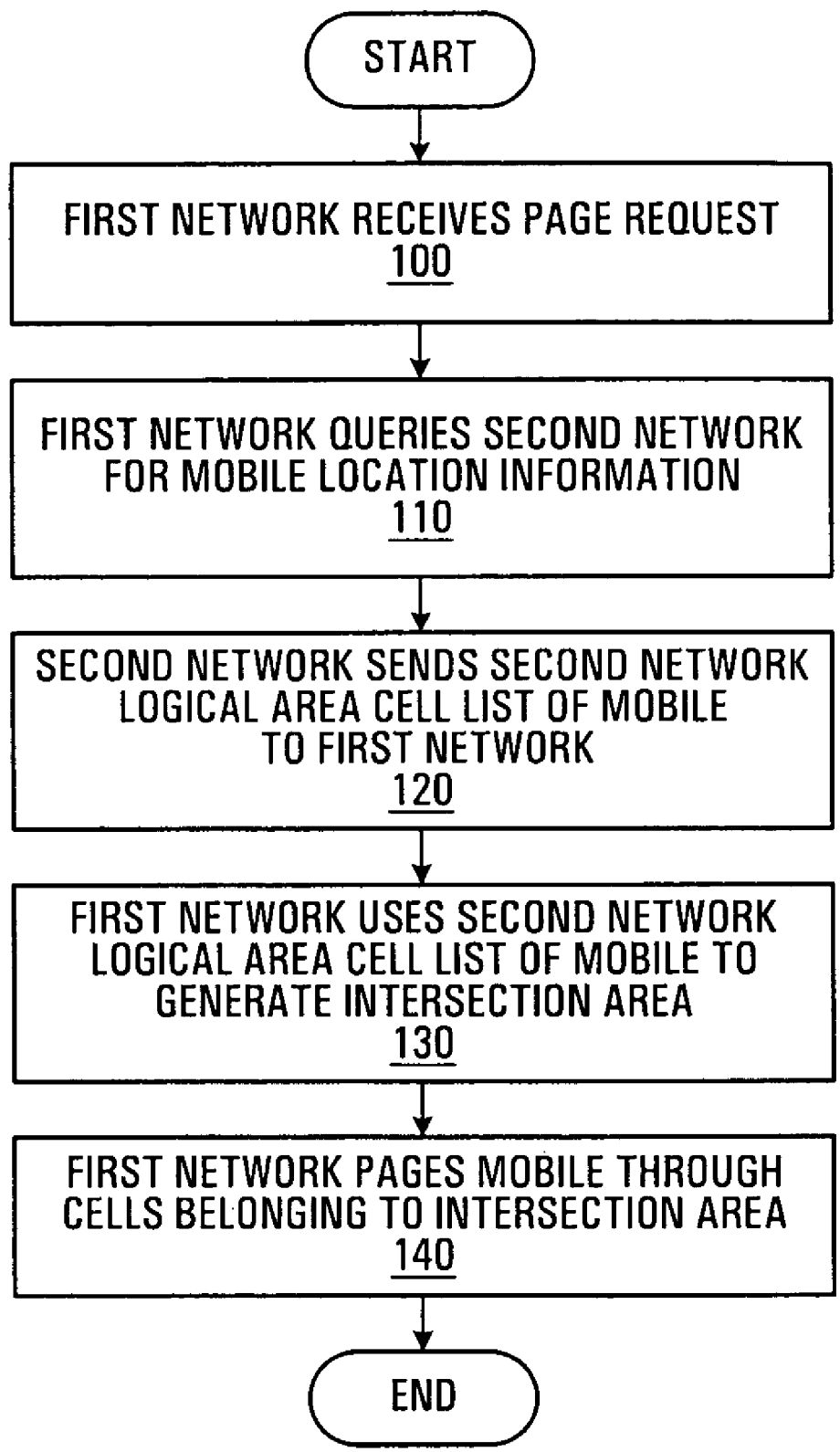
FIG. 3 is a flow diagram depicting steps performed in paging a mobile device according to an embodiment of the disclosure.
Figure 4:
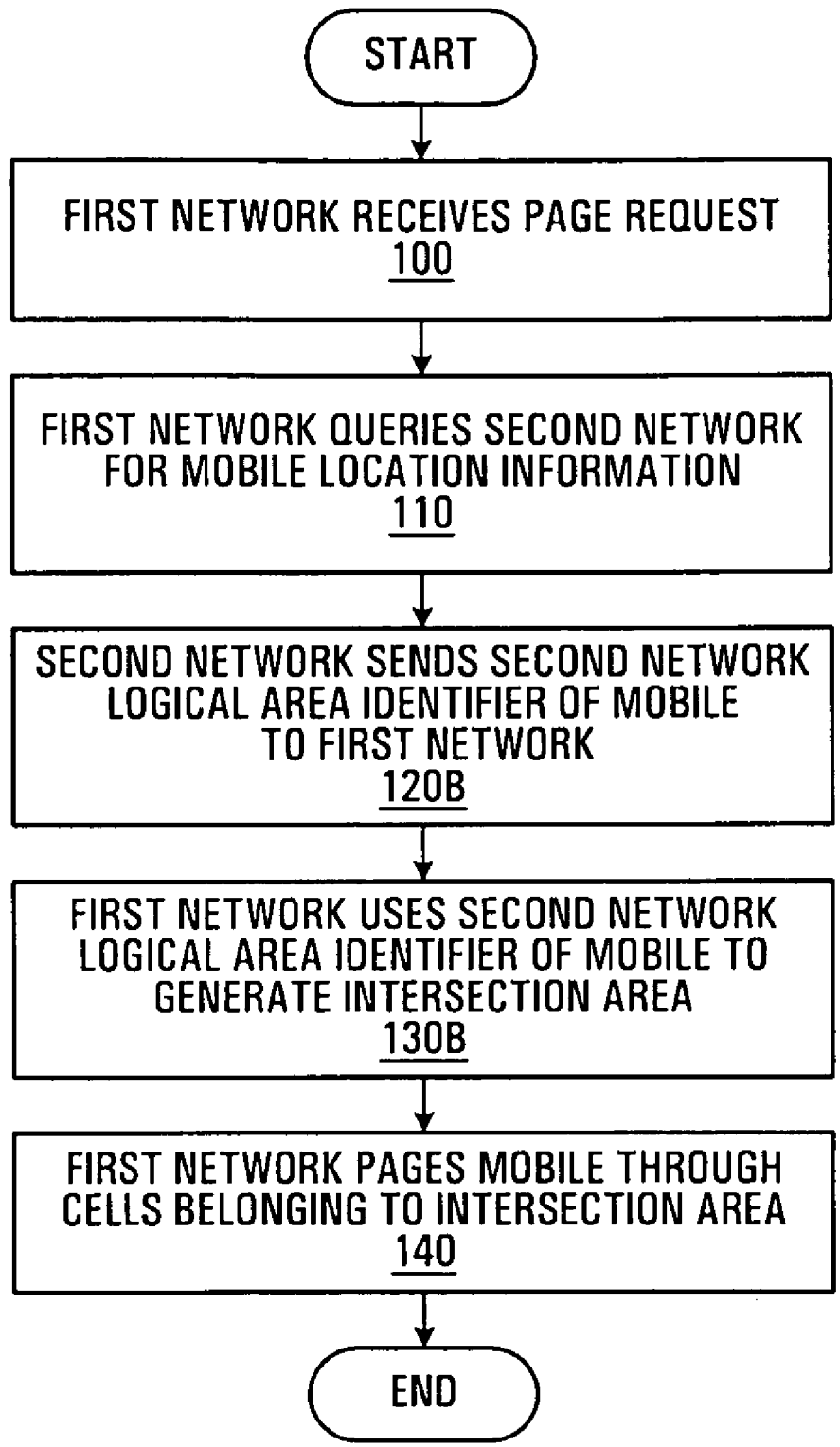
FIG. 4 is a flow diagram depicting steps performed in paging a mobile device according to a further embodiment of the disclosure.

Although there are in general many different ways to implement paging only of the cells of the logical area of one network in which the mobile device is likely located which intersect with cells of a logical area of another network in which the mobile device is likely located, FIGS. 3 and 4 depict preferred embodiments for carrying out the paging.

Referring to FIG. 3, the steps performed in paging a mobile device according to another embodiment of the disclosure are discussed. In this embodiment, paging is performed on a network-by-network basis depending upon the service over which a mobile device is paged. In this embodiment, a first network receives a page request at step 100. Before paging the mobile device, the first network queries the second network for mobile device location information at step 110. According to the embodiment depicted in FIG. 3, the mobile device location information the second network sends to the first network includes the logical area cell list which is a listing of the cells of the logical area of the second network in which the mobile device was most recently located at step 120. The first network has the first network logical area identifier for the first network logical area in which the mobile device was last known to be located, and has access to a listing of the cells of each logical area of the first network. By identifying those cells which are present in both logical areas in which the mobile device was last known to be located (of the first and second network respectively) using the listing of cells for each logical area, an intersection area of cells is generated at step 130. This calculation of the intersection of cells is well suited to the iDEN™ system, since the same cells are used in each network. In the last step 140 only the cells of the intersection area are used to page the mobile device.

Referring to FIG. 4, the steps performed in paging a mobile device according to a further embodiment of the disclosure are discussed. In this embodiment, each of the steps indicated in FIG. 3 are performed except for steps 120 and 130. According to the embodiment depicted in FIG. 4, the second network sends to the first network a logical area identifier corresponding to the logical area of the second network in which the mobile device was most recently located at step 120B. The first network has the logical area identifier for the logical area of the first network in which the mobile device was last known to be located and has access to a listing of the cells of each logical area of the first network and cells of each logical area of the second network. By identifying those cells which are present in both logical areas, using the listing of cells for each network logical area of the first network, and the listing of cells for the second network of the logical area of the second network in which the mobile device was last known to be located, an intersection area of cells is generated at step 130B. As with FIG. 3, in the last step 140 only the cells of the intersection area are used to page the mobile device.

Figure 5:
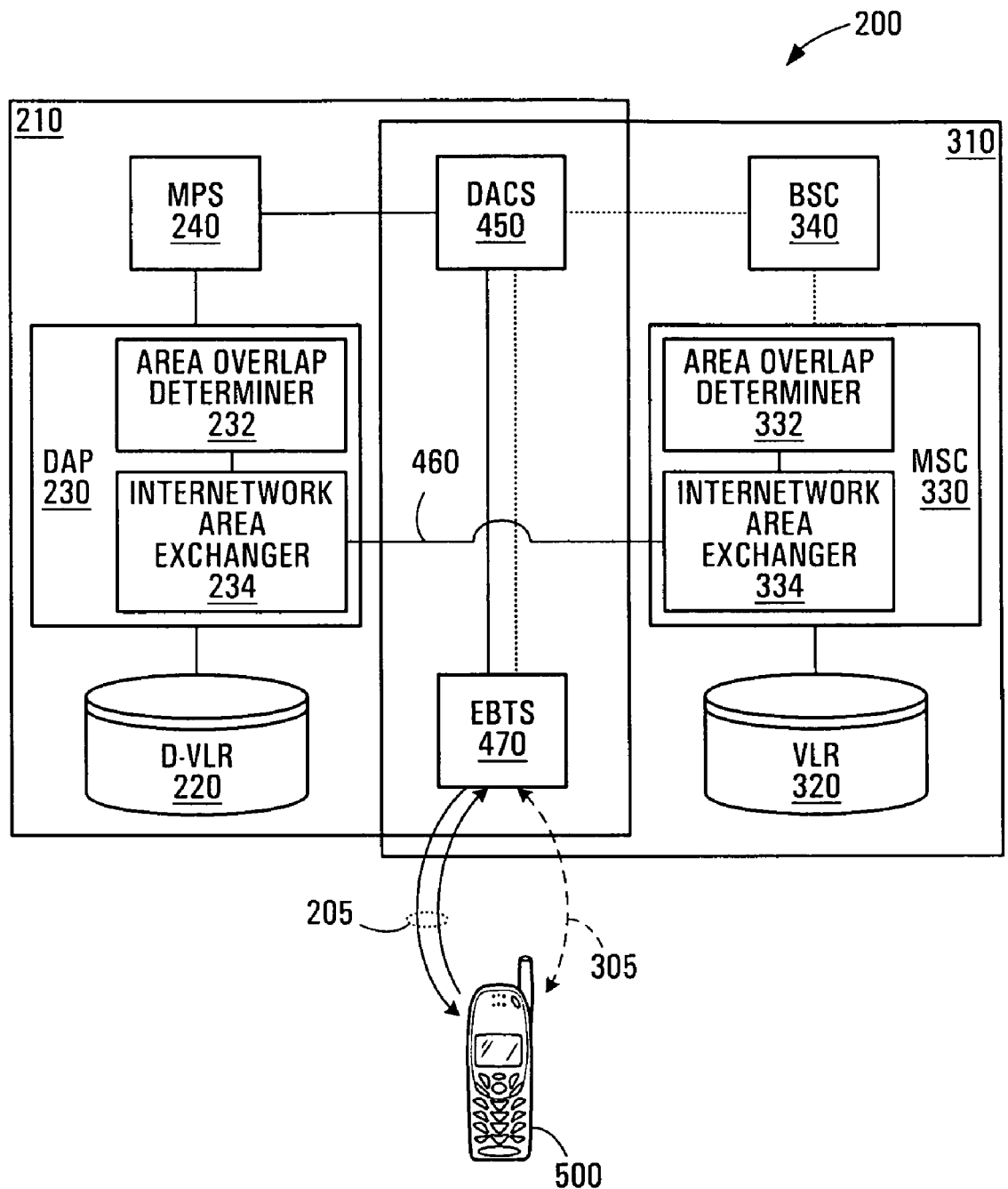
FIG. 5 is a block diagram depicting elements of a system adapted to perform paging of a mobile device according to another embodiment of the disclosure.

Referring now to FIG. 5, a further embodiment of the disclosure will now be discussed. FIG. 5 depicts elements of a system (generally indicated by 200) adapted to perform paging of a mobile device, namely, the elements of an iDEN™ system adapted to perform paging of a mobile device using elements from both the dispatch network and the interconnect network.

The system shown includes a dispatch network 210 and an interconnect network 310.

The dispatch network 210 performs dispatch call processing and includes a modified dispatch application processor (DAP) 230 according to the embodiment of FIG. 5. The DAP includes an internetwork area exchanger (IAE) 234 coupled to an area overlap determiner (AOD) 232. The DAP is coupled to a dispatch visited location register (D-VLR) 220 which stores data related to the tracking of the mobile device, and in this embodiment includes the dispatch area identifiers (DAIS) of the last dispatch location area in which the mobile device was known to be located. The DAP 230 is coupled to a Metro Packet Switch (MPS) 240 which in turn is coupled to a digital access cross-connect switch (DACS) 450. The DACS 450 is coupled to an enhanced base transceiver station (EBTS) 470. The EBTS 470 is shown as being capable of being coupled over either transmit or receive half-duplex dispatch channels 205 with a mobile device 500. It should be understood that EBTS 470 is only one EBTS 470 of a plurality of EBTSs implemented in the system, normally one for each cell. For simplicity only one EBTS is shown, corresponding to the EBTS 470 of the cell in which the mobile device 500 is presently, and last known to be, located.

The interconnect network 310 performs interconnect call processing and includes a modified mobile switching center (MSC) 330 according to the embodiment of FIG. 5. The MSC 330 includes an internetwork area exchanger (IAE) 334 coupled to an area overlap determiner (AOD) 332. The internetwork area exchanger 334 of the interconnect network 310 is coupled to the internetwork area exchanger 234 of the dispatch network 210 by an internetwork area exchange channel 460. The internetwork area exchange channel 460 may be implemented using any of a number of connections and protocols to exchange information, including but not limited to wireless, optical, or electrical line connections, exchanging information over data, control, or message channels sent through the system, through a combination of the networks (210, 310) or directly between the IAE 234 of the dispatch network 210 and the IAE 334 of the interconnect network 310. The MSC 330 is coupled to a visited location register (VLR) 320 which stores data related to the tracking of the mobile device 500, and in this embodiment includes the location area identifiers (LAIs) of the last location area in which the mobile device 500 was known to be located. The MSC 330 is coupled to a base site controller (BSC) 340 which in turn is coupled to the digital access cross-connect switch (DACS) 450. The DACS 450 and the EBTS 470 is shared by both the dispatch network 210 and the interconnect network 310. The EBTS 470 is shown as being capable of being coupled over full-duplex interconnect channel 305 with the mobile device 500.

The functionality of the system 200 adapted to perform paging of a mobile device according to the embodiment of FIG. 5 will now be discussed.

In the dispatch network 210, the DAP 230 upon receiving a request to page the mobile device 500, uses IAE 234 to request, over the internetwork area exchange channel 460, location information from the IAE 334 of the MSC 330 of the interconnect network 310. The MSC 330 accesses the VLR 320 to obtain the location area identifier (LAI) of the location area in which the mobile device 500 was last located, as the MSC 330 would normally do prior to paging the mobile device 500. The IAE 334 of the MSC 330 transmits location information to the IAE 234 of the DAP 230 over the internetwork area exchange channel 460. The location information may include the LAI itself or a list of cells of the location area identified by the LAI. The IAE 234 of the DAP 230 receives either the LAI or the list of cells and forwards this to the AOD 232 of the DAP 230. The DAP 230 accesses the D-VLR 220 to obtain the dispatch area identifier (DAI) of the dispatch location area (DLA) in which the mobile device 500 was last located, as it would normally do prior to paging a mobile device 500. The AOD 232 processes the information retrieved by the IAE 234 from the interconnect network 310, with the information available to the DAP 230 including the DAI and a list of cells of the dispatch location area identified by the DAI to generate an intersection area. The intersection area is made up of the cells which are present both in the DLA identified by the DAI and the LA identified by the LAI. The identification of these cells is available to the DAP 230 for paging purposes. Instead of using a list of all of the cells corresponding to the DLA identified by the DAI from the D-VLR 220, only the intersection area cells are used. Paging is carried out through MPS 240 and DACS 450 over various EBTSs of the cells of the intersection, one of which contains EBTS 470 in the cell in which the mobile device 500 is located.

In the interconnect network 310, the MSC 330 upon receiving a request to page the mobile device 500, uses IAE 334 to request, over the internetwork area exchange channel 460, location information from the IAE 234 of the DAP 230 of the dispatch network 210. The DAP 230 accesses the D-VLR 220 to obtain the dispatch area identifier (DAI) of the dispatch location area in which the mobile device 500 was last located, as the DAP 230 would normally do prior to paging the mobile device 500. The IAE 234 of the DAP 230 transmits location information to the IAE 334 of the MSC 330 over the internetwork area exchange channel 460. The location information may include the DAI itself or a list of cells of the dispatch location area identified in the DAI. The IAE 334 of the MSC 330 receives either the DAI or the list of cells and forwards this to the AOD 332 of the MSC 330. The MSC 330 accesses the VLR 320 to obtain the location area identifier (LAI) of the location area (LA) in which the mobile device 500 was last located, as the MSC 330 would normally do prior to paging the mobile device 500. The AOD 332 processes the information retrieved by the IAE 334 from the dispatch network 210, with the information available to the MSC 330 including the LAI and a list of cells of the location area identified by the LAI to generate an intersection area. The intersection area is made up of the cells which are present both in the LA identified by the LAI and the DLA identified by the DAI. The identification of these cells is available to the MSC 330 for paging purposes. Instead of using a list of all of the cells corresponding to the LA identified by the LAI from the VLR 320, only the intersection area cells are used. Paging is carried out through BSC 340 and DACS 450 over various EBTSs of the cells of the intersection, one of which contains EBTS 470 in the cell in which the mobile device 500 is located.

It should be understood that FIG. 5 depicts only a specific example embodiment implementing an adapted system according to the disclosure. Numerous alternative embodiments in accordance with the disclosure may be arranged in many different ways, including the utilization of different elements or combinations of elements, and the implementation of different media or equipment which function in accordance with the teachings of the present disclosure. In some embodiments for example, one or both of the AOD 232 and IAE 234 may be located separate from the DAP 230 or even exterior to the dispatch network 230. Similarly one or both of the AOD 332 and IAE 334 may be located separate from the MSC 330 or even exterior to the interconnect network 330. In other embodiments one or both of the D-VLR 220 and the VLR 320 may be located external to their respective networks 210 and 310 or may reside in a larger single multiple network database. In some embodiments, the AOD and IAE are part of a single internetwork overlap determiner exchanger (IODE) which performs the functionality of both the AOD and the IAE. It should be understood that the AODs (232, 332), IAEs (234, 334) and other elements depicted in FIG. 5, may be implemented in hardware, software, firmware, or any combination thereof.

It should be understood that although a specific example implementation has been described with respect to FIG. 5 having a specific combination of elements coupled in a certain way, other elements may be utilized without departing from the nature of the disclosure. For example, although not shown in FIG. 5, some embodiments utilize a BTS and/or a call processing server.

Figure 6:
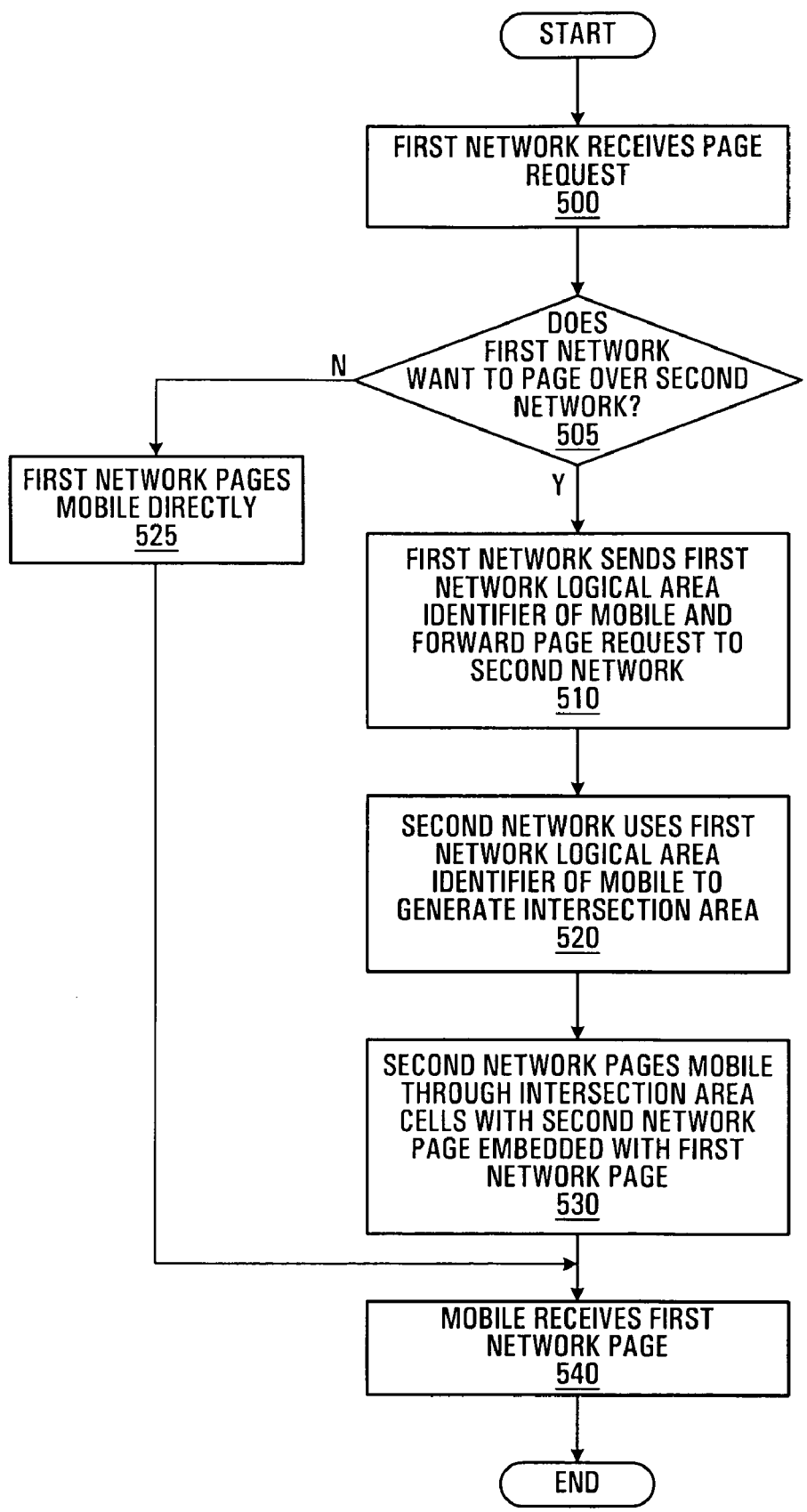
FIG. 6 is a flow diagram depicting steps performed in internetwork paging of a mobile device according to a further embodiment of the disclosure.

Referring to FIG. 6, the steps performed in internetwork paging of a mobile device in first and second networks capable of communicating with each other according to a further embodiment of the disclosure will now be described.

When a mobile device is not active in a first network, but is active, and perhaps in idle mode in a second network, a mobile device is normally completely inaccessible to the first network, to which it appears for all intents and purposes as if the mobile device is powered down. An embodiment of the disclosure uses the second network to alert the mobile device that there is a page for the mobile device on the first network.

At step 500, the first network receives a request to page the mobile device over the first network. At step 505 the network determines if it wants to page the mobile device over the second network. If the mobile device is active on the first network, the first network pages the mobile device directly at step 525. This may be performed in accordance with standard paging techniques or in combination with requested location information from the second network in a similar manner to that described in association with other embodiments described herein. At step 540, if paged directly by the first network, the mobile device receives the first network page.

At step 505, if the first network decides that the mobile device should be paged over the second network, for example if the mobile device is inaccessible to the first network because it is inactive on the first network, at step 510, the first network sends the first network logical area identifier of the mobile device to the second network. The first network also sends a request to the second network to forward a page of the first network. Although the mobile device is inactive on the first network, the logical area identifier is the best and most recent information regarding the location of the mobile device possessed by the first network, which may be of assistance to the paging of the mobile device by the second network as discussed below. The request sent by the first network to the second network indicates to the second network that first network requests that a first network page (embedded in the request) be forwarded to the mobile device.

At step 520, the second network uses the first network logical area identifier to generate an intersection area. At step 530 the second network pages the mobile through the cells of the intersection area with a second network page. The mobile receives the second network page. In this embodiment the page from the first network is itself embedded in the page of the second network.

In some embodiments the second network page contains some metadata indicating the identify of the first network and the fact that it has sent a page to the mobile device. In other embodiments the mobile device is capable of recognizing the page of the first network without any metadata, and hence in those embodiments it is not included in the second page. At step 540 the mobile device receives the page, either directly from the first network (described above) or by recognition and/or extraction of the embedded first network page from the second network page.

After this step, paging is complete, and the mobile device may or may not decide to become active on the first network to answer the page.

Figure 7:
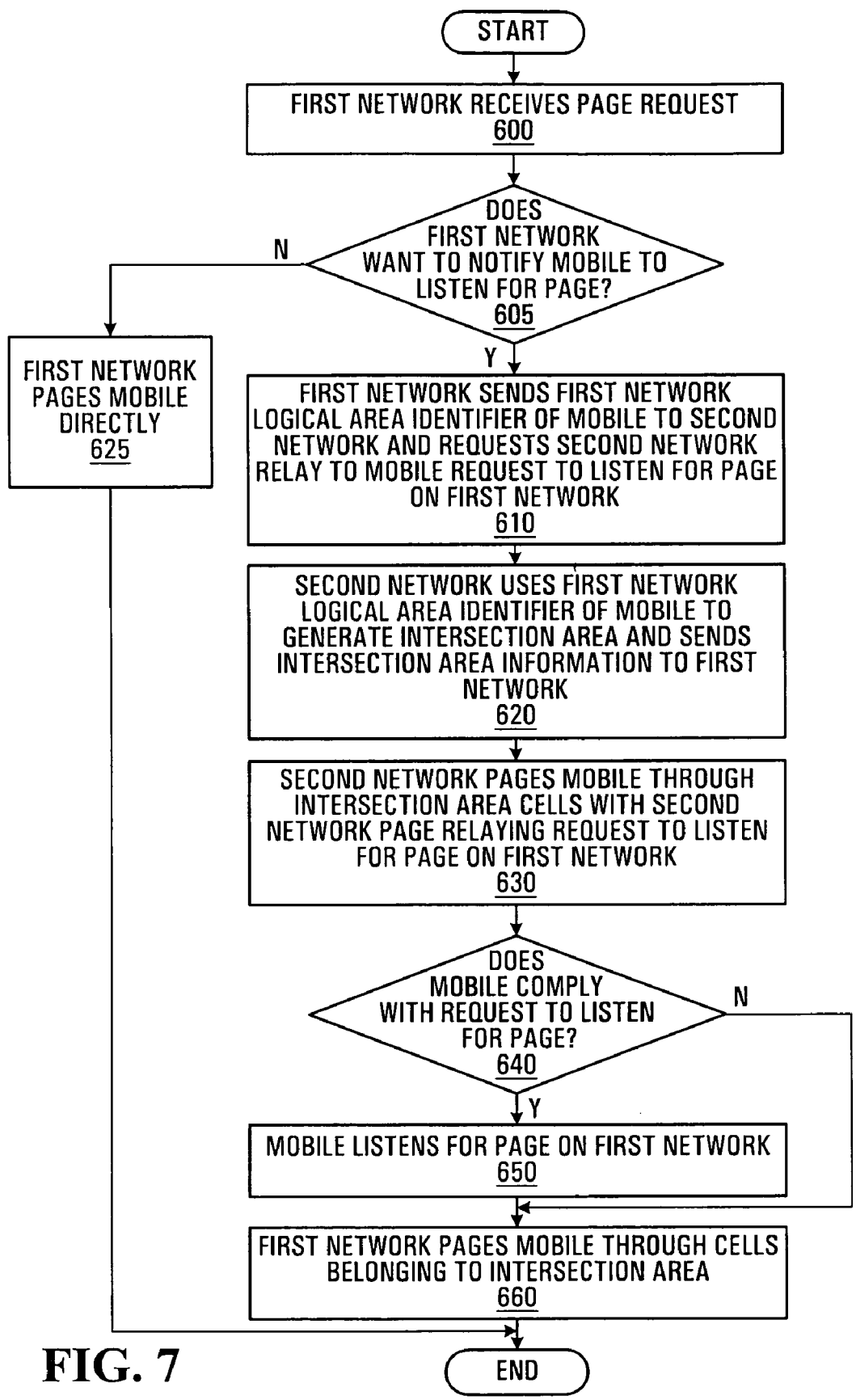
FIG. 7 is a flow diagram depicting steps performed in internetwork paging of a mobile device according to another embodiment of the disclosure.

Referring to FIG. 7, the steps performed in internetwork paging of a mobile device according to another further embodiment of the disclosure, will now be described. This embodiment is similar to the embodiment described in FIG. 6, however, the first network does not request forwarding of a first network page, but instead reserves the paging function for itself, and asks the second network to relay a request for the mobile to listen for a page on the first network. This may reduce the traffic over the second network if the first page contains a relatively large amount of information.

At step 600, the first network receives a request to page the mobile device over the first network. At step 605 the network determines if it wants to page the mobile device over the second network. If the mobile device is active on the first network, the first network pages the mobile device directly at step 625 in an appropriate manner.

If at step 605 the network determines it wants to notify the mobile device to listen for a page over the first network, at step 610, the first network sends the first network logical area identifier of the mobile device to the second network, and requests that the second network relay to the mobile device a request to listen for a page on the first network. The second network uses the first network logical area identifier of the mobile device to generate an intersection area, and sends intersection area information to the first network at step 620. At step 630 the second network pages the mobile device through the cells of the intersection area with a second network page. This page serves to relay to the mobile device that the first network has requested the mobile device to listen for a page on the first network.

At step 640, the mobile device decides whether or not it will comply with the request to listen for the page. If it does not comply with the request, the mobile device does not listen for the page. If it does comply with the page, it listens for the page at step 650. At step 660 the first network pages the mobile device through cells belonging to the intersection area.

Whether or not the mobile is listening, it is either paged in step 660 through the intersection area or paged directly at step 625, before the end of the process.

A mobile device, which heretofore had been unavailable to be paged over a first network because it was not active on the first network, can now be paged through a second network, and paged in a more efficient manner by use of an intersection area. In another embodiment, the wireless communication system includes more than two networks. In such a system the structure of the logical areas of any two or more of the networks are used to reduce the number of cells used to page the mobile device, by only using cells from the intersection of the two or more logical areas of respective networks to page the mobile device.

According to some embodiments, any location information pertaining to the location of the mobile device within a network which may be used to eliminate paging locations or cells from the total area of the network to be paged, may be forwarded to another network in answer to a request for location information. Such information may include but is not limited to a specific set of coordinates locating the mobile device at a location at a specific time, an area defining probabilities of finding the mobile device at various locations at specific times, a series of past or projected locations for a mobile device, or otherwise any other information from one network which could be used to facilitate more efficient paging in another network by virtue of the information helping to define an area in which the mobile device is more likely to be found.

Although the particular embodiments discussed hereinbefore have a network which queries another network for location information prior to paging a mobile device, in general, the network could be provided the necessary location information on an ongoing basis, by for example, the first network periodically requesting the location information from the other network, or by the other network automatically and periodically transmitting the location information to the network. In some embodiments, the other network automatically and periodically transmits the location to the network, whenever the mobile device crosses a logical area boundary of the other network. In embodiments where the other network is such that it does not change often in structure (cells and groupings of cells into logical areas) it is more efficient to transmit only the logical area identifiers, each network possessing enough geographical information of the other respective network to calculate the overlap. In other embodiments the cell list is automatically transmitted.

It should be understood that although the dispatch network and interconnect network of the iDEN™ system have been used as an example implementation to illustrate various embodiments of the disclosure, it should be understood that other embodiments involve different pairs of networks in different systems, for example but not limited to: a dispatch network and a CDMA network, and a packet data network and a voice call network.

Numerous modifications and variations of the present disclosure are possible in light of the above teachings. It is therefore to be understood that within the scope of the appended claims, the disclosure may be practised otherwise than as specifically described herein.

I claim:

1. A method of paging a mobile station in a communications system comprising at least two networks, the method comprising:
    tracking a first location area of the mobile device in a first network;
    tracking a second location area of the mobile device in a second network;
    determining a paging area based on both the first location area and the second location area; and
    transmitting a page in the paging area for the mobile device;
    wherein tracking the first location area is irrespective of the second location area and tracking the second location area is irrespective of the first location area.

2. The method of claim 1, wherein transmitting the page is executed by one of the networks, the method further comprising:
    another one of the networks transmitting a page to the paging area for the mobile device.

3. The method of claim 1, wherein said paging area comprises each possible paging location consistent with both the first location area and the second location area.

4. The method of claim 3, wherein the first location area comprises at least one location in the first network and the second location area comprises at least one location in the second network, wherein said paging area comprises an intersection between the at least one location of the first network and the at least one location of the second network.

5. The method of claim 3, wherein the first location area comprises a logical area of the first network and the second location area comprises a logical area of the second network, wherein said paging area comprises an intersection between the logical area of the first network and the logical area of the second network.

6. The method of claim 5, wherein each paging location within the first network comprises a cell, and wherein the paging area comprises only cells of the first network which intersect with the logical area of the second network.

7. The method of claim 6, wherein the logical area of the second network comprises at least one cell of the second network, and wherein the paging area comprises only cells of the first network which intersect any cell of the logical area of the second network.

8. The method of claim 7, wherein each transmitter for a cell of the first network is co-located with a transmitter for a corresponding co-extensive cell of the second network, and wherein each transmitter for the cell of the first network and the transmitter for the corresponding co-extensive cell of the second network share an antenna.

9. The method of claim 1, wherein the first location area comprises at least one of:
    a first set of cells within the first network within which a mobile device is expected to be located;
    a first logical area within the first network having a first associated set of cells within which a mobile device is expected to be located; and
    a first geographical area within the first network within which a mobile device is expected to be located;
    and wherein the second location area comprises at least one of:
    a second set of cells within the second network within which a mobile device is expected to be located;
    a second logical area within the second network having a second associated set of cells within which a mobile device is expected to be located; and
    a second geographical area within the second network within which a mobile device is expected to be located.

10. The method of claim 1, wherein the first network is an interconnect network, the second network is a dispatch network, and wherein the first location area comprises a location area having a first associated set of cells within the first network within which a mobile device is expected to be located, and the second location information comprises a dispatch location area having a second associated set of cells within which a mobile device is expected to be located.

11. The method of claim 1, further comprising at least one of
    the first network periodically querying the second network for the second location area;
    the second network periodically providing the first network with the second location area;
    the second network providing the first network with the second location area each time a mobile to be paged crosses a boundary of a logical area of the second network; and
    the first network prior to transmitting the page querying the second network for the second location area.

12. The method of claim 1, further comprising:
    comparing the first location area with the second location area;
    generating intersection location area comprising intersection locations defined by the first location area which are also locations defined by the second location area; and
    determining the paging area to comprise paging locations which are defined by the intersection locations.

13. The method of claim 11, further comprising:
    the first network comparing the first location area with the second location area;
    the first network generating intersection location area comprising only intersection locations defined by the first location area which are locations also defined by the second location area; and
    the first network determining the paging area to comprise only paging locations defined by the intersection locations.

14. The method of claim 1, wherein said paging area comprises a geographical area defined by an intersection of the respective known geographical areas of the two networks.

15. The method of claim 1, wherein the first network and the second network comprise a pair of networks, the pair of networks being any one of:

a) an interconnect network and a dispatch network;
b) a dispatch network and a CDMA network; and
c) a packet data network and a voice call network.

16. The method of claim 1, wherein the second network is an interconnect network, and the first network is a dispatch network.

17. The method of claim 1, wherein transmitting the page comprises:
    transmitting the page to the second network;
    embedding the page in a second page of the second network; and
    transmitting said second page on the second network to said paging area.

18. The method of claim 1, further comprising before transmitting the page:
    transmitting a request to listen for the page to said second network; and
    relaying on the second network the request to listen for the page to said paging area.

19. A communications system configured for paging a mobile station, the communications system comprising:
    a first network configured for tracking a first location area of the mobile device;
    a second network configured for tracking a second location area of the mobile device;
    an area overlap determiner configured for determining a paging area based on both the first location area and the second location area; and
    a service controller configured to send a page to the paging area for the mobile device;
    wherein tracking the first location area is irrespective of the second location area and tracking the second location area is irrespective of the first location area.

20. The communications system of claim 19, further comprising:
    a visited location register for storing the first location area, wherein the service controller is further configured to retrieve the first location area; and
    an internetwork area exchanger configured for receiving the second location area; and
    wherein the area overlap determiner is configured to determine the paging area by processing the second location area with the first location area to generate intersection information, wherein the intersection information comprises locations defined by the first location area which are locations also defined by the second location area.

21. The communications system of claim 20, wherein the first location area comprises a first logical area of the first network, and the second location area comprises a second logical area of the second network, and wherein the area overlap determiner is configured to generate the intersection information by determining cells of an intersection area which are located within both the first logical area and the second logical area, and wherein the intersection information defines the cells of the intersection, and wherein the paging locations are co-extensive with the cells of the intersection.

22. The communications system of claim 19, wherein the second network of the system comprises:
    an internetwork area exchanger for communicating the second location area from the second network to the area overlap determiner.

* * * * *